(12) United States Patent
Rai et al.

(10) Patent No.: US 9,946,987 B2
(45) Date of Patent: Apr. 17, 2018

(54) SYSTEM AND METHOD FOR MULTI-LAYERED MONITORING AND CONTROL FOR DYNAMIC SITUATION HANDLING FOR PRODUCTION SUPPORT

(71) Applicant: Tata Consultancy Services Limited, Mumbai (IN)

(72) Inventors: Veerendra Kumar Rai, Hadapsar Pune (IN); Sanjit Mehta, Hadapsar Pune (IN); Praveen Chandak, Hadapsar Pune (IN); Ashish Kumar Jha, Hadapsar Pune (IN); Abhinay Puvvala, Hadapsar Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 442 days.

(21) Appl. No.: 14/513,626

(22) Filed: Oct. 14, 2014

(65) Prior Publication Data
US 2015/0106165 A1    Apr. 16, 2015

(30) Foreign Application Priority Data
Oct. 15, 2013    (IN) .......................... 3239/MUM/2013

(51) Int. Cl.
*G06Q 10/06* (2012.01)

(52) U.S. Cl.
CPC ......... *G06Q 10/0637* (2013.01); *G06Q 10/06* (2013.01)

(58) Field of Classification Search
CPC ................ G06Q 10/063112; G06Q 30/0206
See application file for complete search history.

(56) References Cited

U.S. PATENT DOCUMENTS 5,953,707 A    9/1999  Huang et al.
6,714,889 B2   3/2004  Tezuka
(Continued)

OTHER PUBLICATIONS

George Katsikogiannis, Policy-Based QoS Management for SLA-Driven Adaptive Routing, Jun. 2013, Journal of Communications and Networks http://ieeexplore.ieee.org/document/6559356/?arnumber=6559356&tag=1.*

(Continued)

*Primary Examiner* — Sujay Koneru
*Assistant Examiner* — Mohamed El-Bathy
(74) *Attorney, Agent, or Firm* — Shumaker, Loop & Kendrick, LLP (57) ABSTRACT

A system and method for selecting an optimal policy to be implemented in production support engagement. The system configures a knowledge base including plurality of policies, reference events, and reference scenarios. The plurality of policies is mapped with the plurality of reference scenarios and the plurality of reference events. The plurality of policies is defined in a plurality of layers in a manner that each policy corresponds to a particular layer of the plurality of layers. Relevant policies, out of the plurality of policies, may be selected based on an event received. Simulation may be performed on the relevant policies for identifying first candidate policy. The optimization may be performed on the relevant policies for identifying second candidate policy. The first and second candidate policy indicate the optimal policy to be implemented in the production support engagement.

11 Claims, 9 Drawing Sheets

(56) References Cited

U.S. PATENT DOCUMENTS

| | | | | |
|---|---|---|---|---|
| 2006/0293942 | A1* | 12/2006 | Chaddha | G06Q 10/06 705/7.12 |
| 2010/0057519 | A1* | 3/2010 | Dorai | G06F 9/5033 705/7.13 |
| 2010/0088759 | A1* | 4/2010 | Abzarian | G06F 21/554 726/21 |
| 2012/0250575 | A1* | 10/2012 | Chiang | H04L 41/0823 370/254 |
| 2013/0262060 | A1* | 10/2013 | Higashi | G06F 17/5009 703/6 |

OTHER PUBLICATIONS

Cisco Systems, Service Level Management: Best Practices White Paper, Oct. 2005 http://www.cisco.com/c/en/us/support/docs/availability/high-availability/15117-sla.html.*

Juhani Heilala, et al", Decision Support Using Simulation for Customer-Driven Manufacturing System Design and Operations Planning", Mar. 2010, all pages, INTECH open science / open minds, http://www.intechopen.com/books/decision-support-systems-advances-in/decision-support-using-simulation-for-customer-driven-manufacturing-system-design-and operations-pla.

B. Kadar 1, A. Pfeiffer 1, L. Monostori 1,2,, "Discrete event simulation for supporting production planning and scheduling decisions in digital factories", 1—Computer and Automation Research Institute, Hungarian Academy of Sciences, Budapest, Hungary, 2—Department of Production Informatics, Management and Control, Faculty of Mechanical Engineering, Budapest University of Technology and Economics, Budapest, Hungary, 2004, all pages.

* cited by examiner

|  | Comp1 | Comp2 |
|---|---|---|
| Level1 | 2 | 1 |
| Level2 | 1 | 2 |

308

| Parameter | Pre Event | Post Event, Pre Intervention | Post Intervention |
|---|---|---|---|
| SLA compliance | 98.83% | 94.45% | 99.32% |
| Resource Utilization | 65.30% | 83.21% | 72.47% |

310

|  | Comp1 | Comp2 |
|---|---|---|
| Level1 | 2 | 2 |
| Level2 | 2 | 3 |

| Priority distribution of tickets | |
|---|---|
| Critical | 15.00% |
| High | 30.00% |
| Medium | 35.00% |
| Low | 20.00% |
| Levels of Support | 2 |
| Competencies | 2 |
| Competency Distribution of tickets | |
| Competency 1 | 40.00% |
| Competency 2 | 60.00% |
| Mean Effort Time | 29 |
| SLA compliance Time (minutes) | |
| Critical | 40 |
| High | 60 |
| Medium | 80 |
| Low | 120 |

314

| | Comp1 | Comp 2 |
|---|---|---|
| Level1 | 2 | 1 |
| Level2 | 1 | 2 |

| Parameter | | Pre Intervention | Post Intervention |
|---|---|---|---|
| SLA compliance | Critical | 96.40% | 99.10% |
| | High | 97.20% | 98.27% |
| | Medium | 97.31% | 97.14% |
| | Low | 97.43% | 95.72% |
| Resource Utilization | | 64.81% | 72.36% |

Figure 3D

| 318 | Priority distribution of tickets | |
|---|---|---|
| | Critical | 15.00% |
| | High | 30.00% |
| | Medium | 35.00% |
| | Low | 20.00% |
| | Levels of Support | 2 |
| | Competencies | 2 |
| | Competency Distribution of tickets | |
| | Competency 1 | 40.00% |
| | Competency 2 | 60.00% |
| | Mean Effort Time (Incidents) | 30 mins |
| | Mean Effort Time (Problems) | 54 mins |
| | SLA compliance Time (minutes) | |
| | Critical | 40 |
| | High | 60 |
| | Medium | 80 |
| | Low | 120 |

320

| | Incident Management | | Problem Management |
|---|---|---|---|
| | Comp 1 | Comp 2 | |
| Level1 | 2 | 2 | 4 |
| Level2 | 1 | 2 | |

Figure 3E

| Parameter | | Pre Intervention | Post Intervention |
|---|---|---|---|
| SLA compliance | | 98.46% | 99.910% |
| Problems Solved | | - | 108 |
| Resource Utilization | Incident Management | 75.24% | 69.97% |
| | Problem Management | - | 64.23% |

SYSTEM AND METHOD FOR MULTI-LAYERED MONITORING AND CONTROL FOR DYNAMIC SITUATION HANDLING FOR PRODUCTION SUPPORT

CROSS-REFERENCE TO RELATED APPLICATIONS AND PRIORITY

The present application claims priority to Indian Provisional Patent Application No. 3239/MUM/2013, filed on Oct. 15, 2013, the entirety of which is hereby incorporated by reference.

TECHNICAL FIELD

The present subject matter described herein, in general, relates to system and method for selecting policies to govern a production support engagement.

BACKGROUND

Production support engagement is a discipline for supporting IT systems/applications which are currently being used by end users. In an enterprise, while executing production support engagement or production support service, a plurality of situations may arise. The situations may comprise of undesirable patterns or events arising due to changes in environment or existing policy decisions in any production support engagement. Further, the incidents may comprise but is not limited to increase in number of tickets raised, decrease in the number of team members, decommissioning or addition of an application or module. Thus, considering all these factors simultaneously for providing a smooth operation in day-to-day business activities is a challenge in the production support engagement.

The current technologies and methods for IT service operations management are reactive in nature. The current technologies provides dashboards from past data and problems are solved post they occur. What-If analysis capabilities of the current technologies are regressive and do not follow a systemic approach. Further, the current methods do not recognize the fact that situation handling by policy interventions could be of different kinds. Further, the decision support features provided by the existing tools and technologies includes dashboard generation, Key performance indicator (KPI) tracking, and tools and techniques for data analytics. Although, these tools facilitate decision making process through different features, but they are not capable of providing intelligence and optimization methods required to formulate policy decisions.

In the production support engagement, a policy, a pattern of behaviors, and an event are inter-related to each other. Different examples for pattern of behaviors may be increase in number of situations or incidents per month, change in the pattern of distribution of incidents, percentage of unresolved incidents using Known Error Database (KEDB), percentage of high priority situations or incidents, and oscillation in service level agreement (SLA) compliance. Further, the patterns of behavior can also be caused due to environmental triggers, and not necessarily by policies alone. If these patterns are not addressed properly, it may deter IT operations in the production support engagement. To handle such undesirable patterns, formulating policies in the production support engagement becomes a challenge.

SUMMARY

This summary is provided to introduce aspects related to systems and methods for selecting an optimal policy to be implemented in a production support engagement and the concepts are further described below in the detailed description. This summary is not intended to identify essential features of subject matter nor is it intended for use in determining or limiting the scope of the subject matter.

In one implementation, a system for selecting an optimal policy to be implemented in a production support engagement is disclosed. The system comprises a processor and a memory coupled to the processor. The processor executes a plurality of modules stored in the memory. The plurality of modules comprises a configuring module, receiving module, selecting module, and processing module. The configuring module may configure a knowledge base for a production support engagement. The knowledge base may further comprise a plurality of policies, a plurality of reference events, and a plurality of reference scenarios. Further, a policy of the plurality of policies may be associated with a layer of a plurality of layers. The policy may be further mapped with a reference scenario, of the plurality of reference scenarios, and a reference event, of the plurality of reference events. Further, the reference event may indicate a reference change occurring in the production support engagement. Further, the policy may indicate a modification in a structure of the production support engagement corresponding to the reference scenario in order to respond the reference event. Further, the receiving module may receive an event indicating a real time change occurring in the production support engagement. Further, the selecting module may select a set of relevant policies from the plurality of policies by matching the event with one of the plurality of reference events. Further, the processing module may process the set of relevant policies by either simulating or optimizing the set of relevant policies after being simulated. The simulating of one or more relevant polices selected by a user may be performed in order to identify a first candidate policy. Further, the one or more relevant polices are simulated based upon a plurality of scenarios using an agent-based simulation model. Further, the first candidate policy identified may meet a service level agreement (SLA). Further, for optimizing the set of relevant policies, at first, the set of relevant policies are simulated based upon the plurality of scenarios using the agent-based simulation model. After the simulation, a plurality of constraints and objectives may be applied on the set of relevant policies simulated using optimization model in order to identify a second candidate policy of the set of relevant policies meeting the SLA. Further, at least one of the first candidate policy and the second candidate policy may indicate an optimal policy to be to be implemented in a production support engagement.

In another implementation, a method for selecting an optimal policy to be implemented in a production support engagement is disclosed. The method may comprise configuring, by a processor, a knowledge base for a production support engagement. The knowledge base may further comprise a plurality of policies, a plurality of reference events, and a plurality of reference scenarios. Further, a policy of the plurality of policies may be associated with a layer of a plurality of layers. Further, the policy may be mapped with a reference scenario, of the plurality of reference scenarios, and a reference event, of the plurality of reference events. The reference event may indicate a reference change occurring in the production support engagement, and the policy may indicate a modification in a structure of the production support engagement corresponding to the reference scenario in order to respond the reference event. Further, the method may comprise a step of receiving, by the processor, an event indicating a real time change occurring in the production support engagement. The method may further comprise a step of selecting, by the processor, a set of relevant policies from the plurality of policies by matching the event with one of the plurality of reference events. Further, the method may comprise a step of processing, by the processor, the set of relevant policies by performing simulation or optimization. In one aspect, the step of simulating of one or more relevant policies selected by a user may be performed in order to identify a first candidate policy. Further, the one or more relevant policies are simulated based upon a plurality of scenarios using an agent-based simulation model. The first candidate policy identified may meet a service level agreement (SLA). In other aspect, the step of optimization is performed by simulating the set of relevant policies based on the plurality of scenarios using the agent-based simulation model. After the simulation, a step is performed for applying plurality of constraints and objectives upon the set of relevant polices simulated using an optimization model to identify a second candidate policy meeting the SLA. Further, at least one of the first candidate policy and the second candidate policy may indicate an optimal policy to be to be implemented in the production support engagement.

Yet in another implementation a non-transitory computer readable medium embodying a program executable in a computing device for selecting an optimal policy to be implemented in a production support engagement is disclosed. The program may comprise a program code for configuring a knowledge base for a production support engagement. The knowledge base may further comprise a plurality of policies, a plurality of reference events, and a plurality of reference scenarios. Further, a policy of the plurality of policies may be associated with a layer of a plurality of layers. Further, the policy may be mapped with a reference scenario, of the plurality of reference scenarios, and a reference event, of the plurality of reference events. Further, the reference event may indicate a reference change occurring in the production support engagement, and the policy may indicate a modification in a structure of the production support engagement corresponding to the reference scenario in order to respond the reference event. The program may further comprise a program code for receiving an event indicating a real time change occurring in the production support engagement. Further, the program may comprise a program code for selecting a set of relevant policies from the plurality of policies by matching the event with one of the plurality of reference events. The program may further comprise a program code for processing the set of relevant policies by performing simulation or optimization. In one aspect, simulation of one or more relevant policies selected by a user may be performed in order to identify a first candidate policy. Further, the one or more relevant policies are simulated based upon a plurality of scenarios using an agent-based simulation model. Further, the first candidate policy identified may meet a service level agreement (SLA). In other aspect, optimization may be performed on the set of relevant policies after being simulated. At first, the set of relevant policies are simulated based upon the plurality of scenarios using an optimization model. After the simulation, a plurality of constraints and objectives may be applied on the set of relevant policies simulated using an optimization model in order to identify a second candidate policy of the set of relevant policies meeting the SLA. Further, the first candidate policy and the second candidate policy may indicate an optimal policy to be implemented in the production support engagement.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for providing multi-layered monitoring and control of information technology (IT) service management operations to ensure service availability and service quality are described. Different situations like undesirable patterns and events may arise due to changes in environment or due to existing policy decisions in a production support engagement. If theses undesirable patterns and events are not handled properly, it may lead to deter IT service operations from achieving a set goal. Thus, to handle such undesirable patterns and events, the present disclosure provides the system and method for formulating policies in the production support engagement.

The policies may be formulated for ensuring that desired objective, constraints, and service level agreement (SLA) of an enterprise are met. The policies formulated may comprise different parameters like cost, risk, and side-effects which need to be optimized. According to embodiments of present disclosure, a knowledge base may be configured for the production support engagement. The knowledge base may comprise a plurality of policies, a plurality of reference events, and a plurality of reference scenarios. The knowledge base further comprises mapping details of the plurality of policies with the plurality of references events and the plurality of reference scenarios. The policies mapped are most effective for mitigating any unfavorable patterns of behaviors caused by a reference scenario of plurality of reference scenarios. Further, a reference event, of the plurality of reference events, may indicate a reference change occurring in the production support engagement. Similarly, a policy, of the plurality of polices, may indicate a modification in a structure of the production support engagement corresponding to the reference scenario in order to respond the reference event. Further, the plurality of policies may be defined in plurality of layers (hereinafter also referred as "governance layers") in such a manner that each layer comprises a set of policies of the plurality of policies.

After configuring the knowledge base, the system may receive an event which indicates a real time change occurring in the production support engagement. For responding such event, the system may suggest a set of relevant policies to be implemented in the production support engagement. The set of relevant policies may be suggested by matching the event with the plurality of reference events. Further, the system also provides flexibility to the user to obtain an optimal policy of the set of relevant policies. According to embodiments of present disclosure, the optimal policy may be obtained by simulating the set of relevant policies using an agent-based simulation model or optimizing the set of relevant policies after being simulated using an optimization model. According to one embodiment of present disclosure, the plurality of layers may comprises three layers i.e., layer 1, layer 2, and layer 3 (three-tiered policies). Further, the detail explanation of each layer is provided in subsequent paragraphs of specification.

In one embodiment, the agent-based simulation model may simulate one or more relevant policies selected by a user based upon the plurality of scenarios in order to identify a first candidate policy meeting a service level agreement (SLA). For example, the user may select 3 relevant policies (P1, P2, and P3) out of set of 5 relevant policies (P1, P2, P3, P4, and P5). Based on the user selection, the simulation may be performed on the 3 relevant policies (P1, P2, and P3) only for identifying the first candidate policy (i.e., an optimal policy). In this example, the user might not consider rest of the two policies (i.e., P4 and P5) for simulation, since these two polices might not be feasible to implement in the production support environment due to some external constraints (lack of resources with relevant skills, pre-agreed contractual obligations limiting changes in the production support engagement, client's data security concerns). In other words, the two policies i.e., P4 and P5 may not be considered for identifying the optimal policy. In another embodiment, the optimization may be performed by simulating the set of relevant policies first, and then applying plurality of constraints and objectives on the set of relevant policies after the simulation using an optimization model in order to identify a second candidate policy meeting the SLA. It should be noted that, at least one of the first candidate policy and the second candidate policy may be considered as the optimal policy to be implemented in the production support engagement. Thus, the optimal policy implemented may keep the production support engagement in a steady state i.e., where all the SLAs agreed between the enterprise (service providers) and clients as-well-as other constrains and objectives of the enterprise or service providers are met.

While aspects of described system and method for selecting the optimal policy may be implemented in any number of different computing systems, environments, and/or configurations, the embodiments are described in the context of the following exemplary system.

Figure 1:
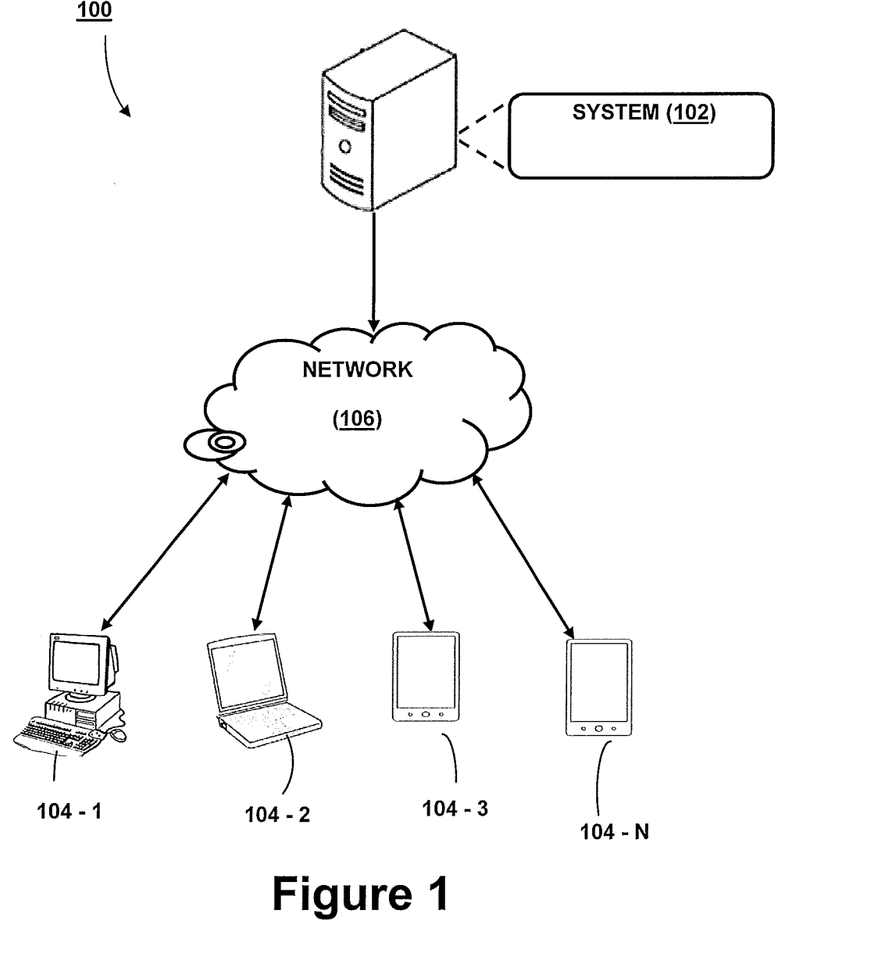
FIG. 1 illustrates a network implementation of a system for selecting an optimal policy to be implemented in a production support engagement, in accordance with an embodiment of the present subject matter.

Referring to FIG. 1, a network implementation 100 of a system 102 for selecting the optimal policy is illustrated, in accordance with an embodiment of the present subject matter. In one embodiment, the system 102 facilitates the selection of the optimal policy to be implemented in the production support engagement. Although the present subject matter is explained considering that the system 102 is implemented as a computing system, it may be understood that the system 102 may also be implemented as a variety of computing systems, such as a laptop computer, a desktop computer, a notebook, a workstation, a mainframe computer, a server, a network server, a tablet, a mobile phone, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
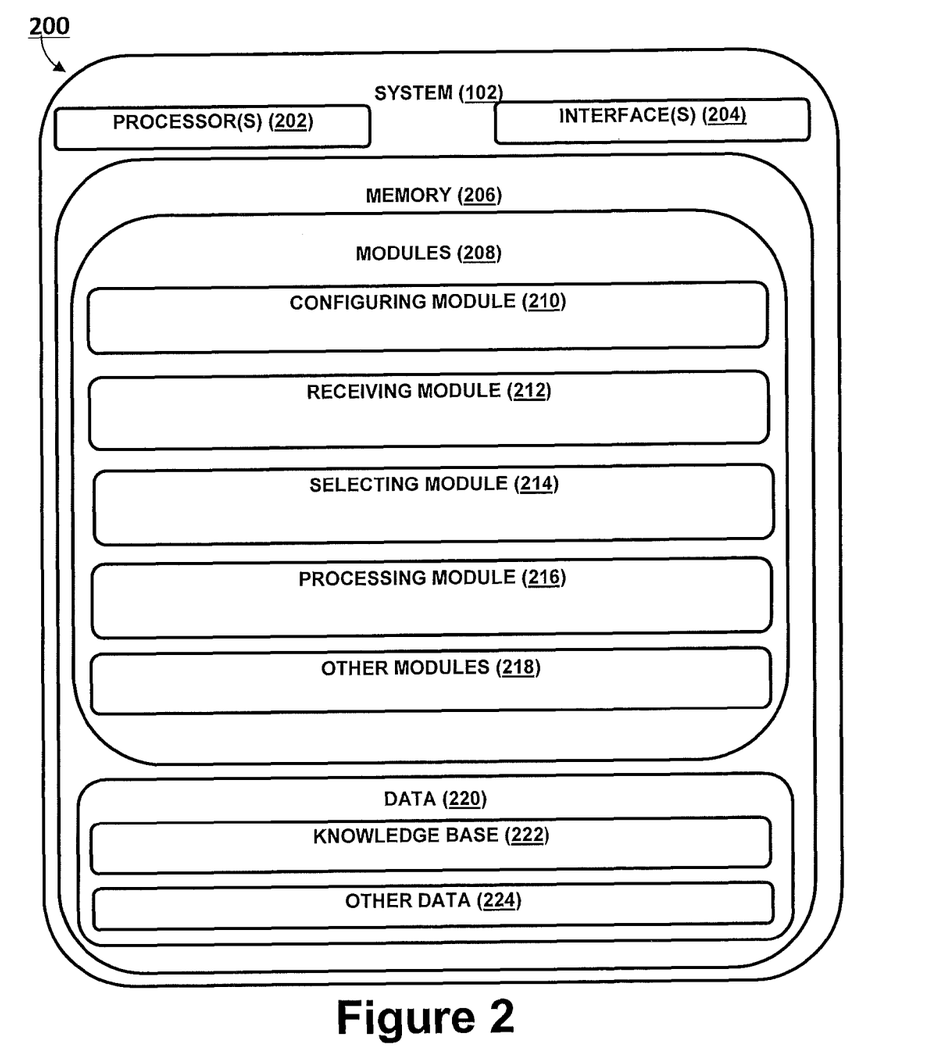
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 220.

The modules 208 include routines, programs, objects, components, data structures, etc., which perform particular tasks or implement particular abstract data types. In one implementation, the modules 208 may include a configuring module 210, a receiving module 212, a selecting module 214, a processing module 216, and other modules 218. The other modules 218 may include programs or coded instructions that supplement applications and functions of the system 102.

The data 220, amongst other things, serves as a repository for storing data processed, received, and generated by one or more of the modules 208. The data 220 may also include knowledge base 222, and other data 224.

Referring now to FIG. 3A-3F is an example illustrating the selection of the optimal policy to be implemented in the production support engagement in detail implemented by the system 102, in accordance with an embodiment of the present subject matter. Since, the primary resource for the production support engagement are employees (i.e., human resources), the objective of the system 102 is to formulate different policies for optimizing the output through these human resources. Another objective of present disclosure is to formulate the policies not only from service provider's perspective, but also from customer's/client's perspective. For example, the system 102, in one perspective, may provide SLA compliance which may be useful for the customer/client, and at other perspective, may provide employee/resource utilization which may be useful for the service provider/enterprise.

According to embodiments of present disclosure, the configuring module 210 of the system 102 may configure the knowledge base 222 for the production support engagement. The knowledge base 222 may comprise a plurality of policies, a plurality of reference events, and a plurality of reference scenarios. A reference event of the plurality of reference events may indicate a reference change occurring in the production support engagement. Similarly, a policy of the plurality of policies may indicate a modification to be done in a structure of the production support engagement corresponding to a reference scenario to counter the reference changes i.e., the reference events occurring in the production support engagement.

Further, the receiving module 212 of the system 102 may receive an event indicating a real time change occurring in the production support engagement. For responding such event, the selecting module 214 of the system 102 may select a set of relevant policies from the plurality of policies by matching the event with one of the plurality of reference events stored in the knowledge base 222. Further, the set of relevant policies selected may be further processed by using the processing module 216 of the system 102. In one embodiment, the processing module 216 simulates one or more relevant policies selected by the user, using an agent-based simulation model, based upon a plurality of scenarios in order to identify a first candidate policy meeting a service level agreement (SLA). The first candidate policy indicates the optimal policy in this case. In another embodiment, the processing module 216 optimizes the set of relevant policies by performing the simulation on the set of relevant policies, and then, applying plurality of constraints and objectives on the set of relevant policies after being simulated using an optimization model to identify a second candidate policy of the set of relevant policies meeting the SLA. The second candidate policy indicates the optimal policy in this case. Further, the implementation of the simulation and the optimization in the production support engagement is explained below in detail.

As discussed above, the plurality of policies may be defined in the plurality of layers (governance layers) in such a manner that each layer comprises a set of policies of the plurality of policies. According to embodiments of present disclosure, the plurality of layers comprises layer 1, layer 2, and layer 3. The set of policies bounded by their respective layers (layer 1, layer 2, and layer 3) have their unique functionality which is to be followed while implementing the policies in the production support engagement. All these 3 layers are explained in detail in subsequent paragraphs of the specification.

Figure 3A:
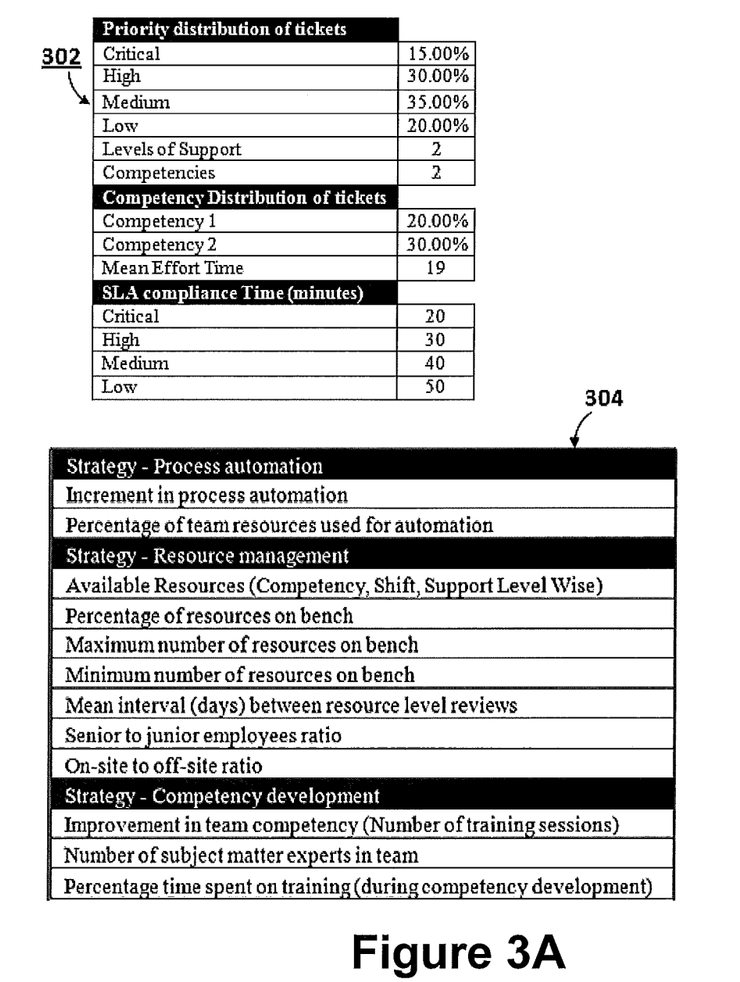
FIG. 3A-3F illustrates an example illustrating selecting the optimal policy in detail, in accordance with an embodiment of the present subject matter.
Figure 3B:
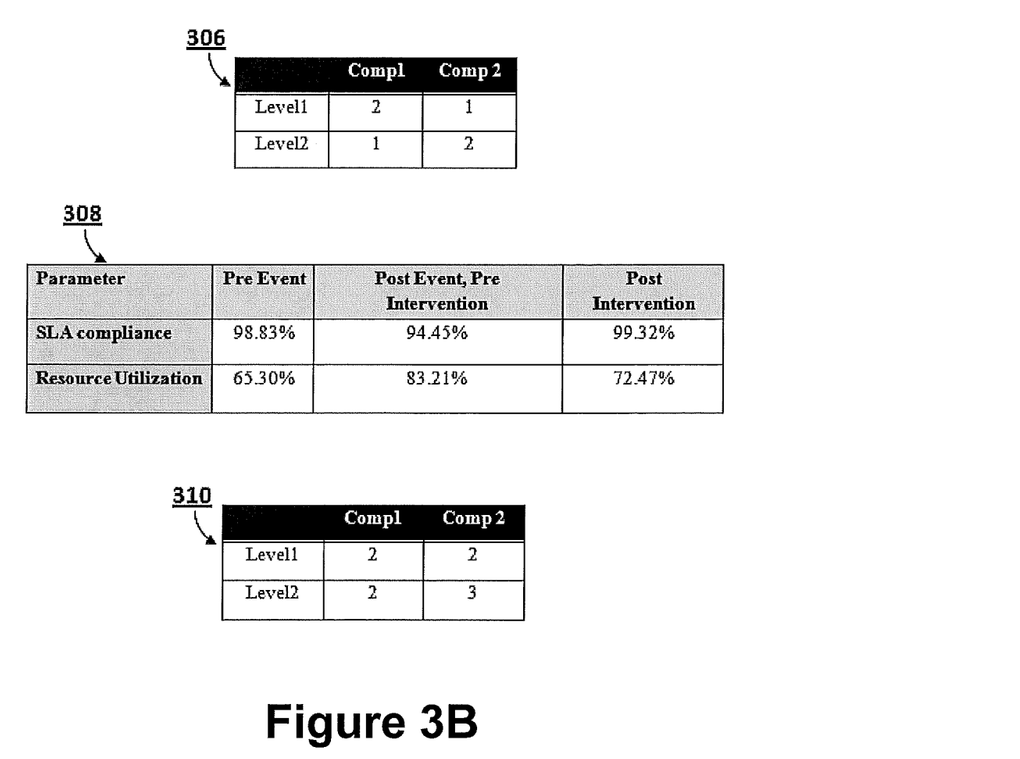
Figure 3C:
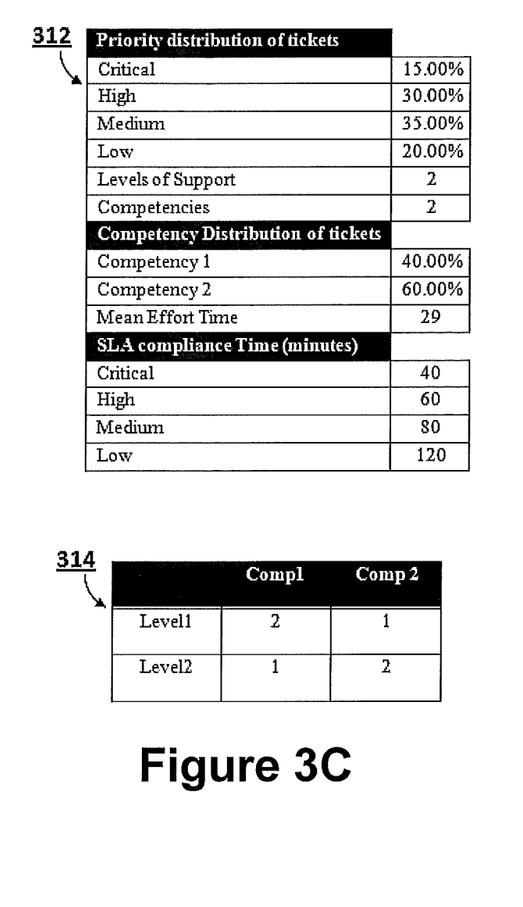
Figure 3D:
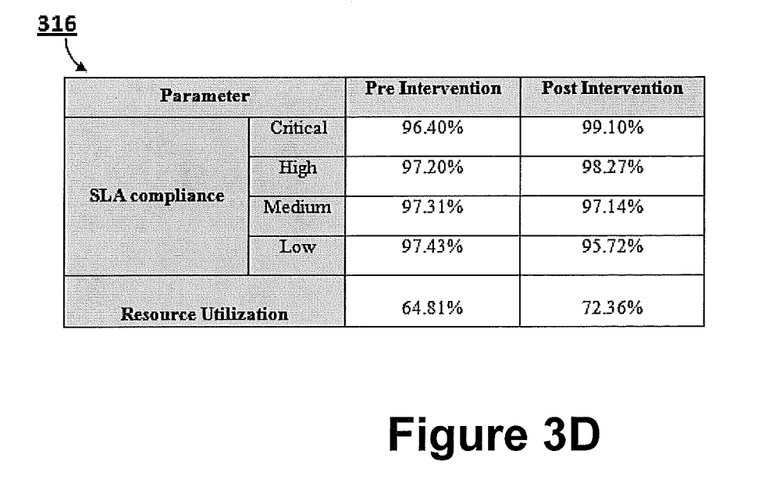
Figure 3E:
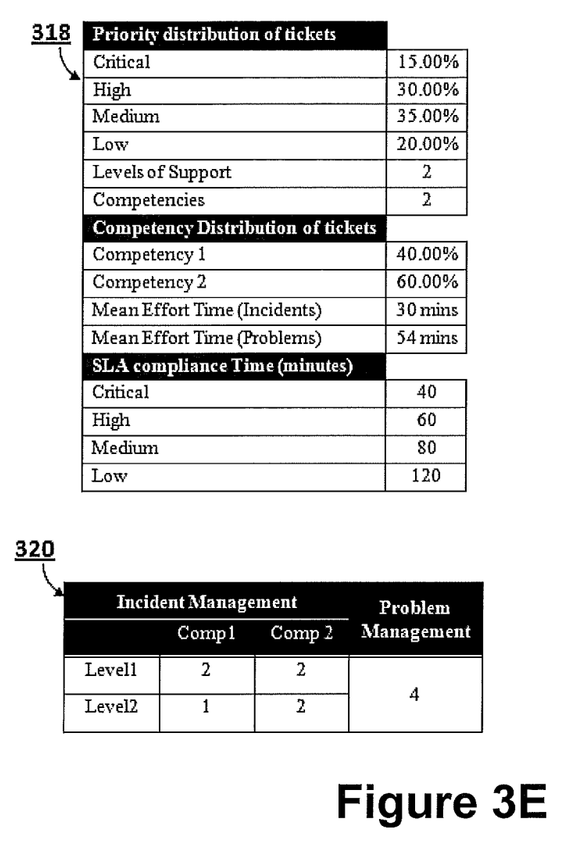
Figure 3F:
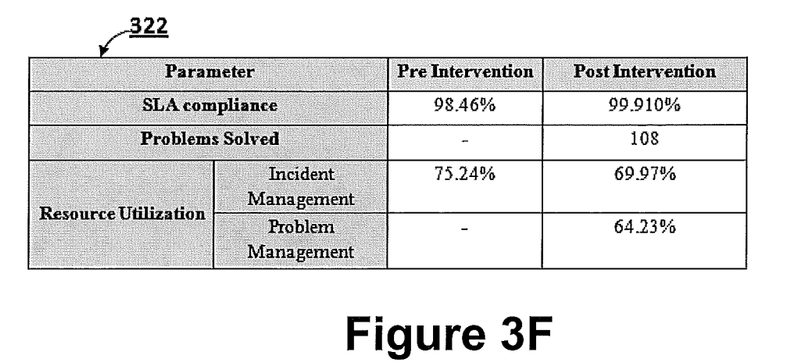

The first layer i.e., the layer 1 has a policy intervention of changing levels of existing structural elements. At first, the system 102 may initialize a plurality of contextual parameters as shown in table 302 of FIG. 3A. On basis of objectives and constraints, the set of relevant policies may be outlined for user selection. In one example, the set of relevant policies may comprise process automation, resource management, competency management, and knowledge management. The user is required to select one or more policies out of the set of relevant policies to deal with contextual changes (i.e., the event) occurring in the production support engagement. According to embodiments of present disclosure, a set of levers corresponding to the set of relevant policies applicable for handling the event is shown in table 304 of FIG. 3A. Further, table 306 of FIG. 3B illustrates resources setup at pre policy intervention.

In the present example, the simulation runs for 4 days before the event takes place. After the 4 days, the system 102 is countered with the event (i.e., deployment of a new module and the consequent incidence of newer tickets). Based on this event, a mean effort it takes to resolve incidents has gone up from 19 minutes to 26 minutes. The raise in mean effort impacts the SLA compliance and resource utilization. With the same number of resources, it is apparent that, there may be a fall in SLA compliance (considering SLA to be 95%) and in the case where it drops below the minimum levels required by the client/customer. In this situation, the user needs to intervene with the levers at his/her disposal to bring back the SLA compliance to acceptable levels which is above 95%.

In this circumstance, the processing module 216 may select the optimal policy as "resource management" from the set of relevant policies (process automation, resource management, competency management, and knowledge management). By changing the resources in each category, the system 102 may bring back the SLA compliance to acceptable levels. The table 308 of FIG. 3B shows and average resource utilization and the SLA compliance levels at different stages (i.e., pre-event, post-event and pre intervention, and post intervention). Further, the table 310 shows the resource configuration post intervention. From table 310, it can be observed that a level of structural elements is changed in relative to the table 308. Thus, from all the different possible policy interventions to handle the event, the processing module 216 selects the "resource management", more specifically, resource addition (i.e., changing the level of the structural elements), for handling the event in the first layer (Layer 1) of the present disclosure.

The next layer i.e., the second layer (layer 2) has a policy intervention for changing relationships/rules between/that govern existing structural elements. In the production support engagement, the IT production support systems are governed by a set of rules put together to form an operational level agreement (OLA). For example, these rules may include but not limited to ticket assignment rules, escalation rules, and preemption rules. The user may often change these rules based on resource availability and ticket backlog to honor short term SLA commitments.

Considering a case in which the client/customer may desire to change the contractual agreement to include variable SLA noncompliance penalties on the basis of ticket priority. Now, in this case, it can be observed that the product support engagement is governed not only by SLA compliance, but it is also dependent on the ticket priority. Then, the user may have to react with increased attention towards higher priority tickets. For implementing this, the following preemption rules are changed as shown in table 1 below.

The table 1 includes a pre and post intervention preemption rules respectively.

TABLE 1

Pre and Post intervention preemption rules.

| | Rules | Rule Description |
|---|---|---|
| Pre intervention | No interruption | Once a ticket is assigned to a resource, he/she remains unavailable for further ticket allocation until the assigned ticket is solved |
| Post intervention | Priority based interruption | Engaged resources preempt in the case of occurrence of a higher priority ticket. They release the existing ticket back into the queue after updating the work done on it and attempt to resolve the ticket with higher priority. |

Thus, from the above table, it can be observed that based on priority, the employee (person who is responding the tickets) may release the existing ticket back into queue and focus his/her attention in resolving the high priority tickets. For this example, plurality of contextual parameters initialized by the system 102 is shown in table 312 of FIG. 3C. Further, the resource setup corresponding to this example is shown in table 314 of FIG. 3C. In this circumstance, the processing module 216 may apply the optimal policy by following the policy intervention of changing relationships between structural elements or by changing rules that govern these structural elements. After implementing this optimal policy, the impact on the SLA compliance and resource utilization pre and post preemption rule changes which can be seen in table 316 of FIG. 3D. Thus, by changing the preemption rules, not only have the SLA compliances of higher priority tickets improved but also resulted in better resource utilization.

Further, the next layer i.e., the third layer (layer 3) has a policy intervention of adding new structural elements or deleting an existing structural element. Considering a case in which a service provider, pre intervention, may be only responsible for "incident management" function but was also given an opportunity for handling the "problem management". This kind of event demands addition of new structural elements (i.e., resources, software agents etc). For this case, a plurality of contextual parameters and resource utilization setup initialized by the system 102 can be seen in table 318 and 320 respectively of FIG. 3E. In this circumstance, the processing module 216 may apply the optimal policy i.e., "adding new structural elements" for handling such event. After implementation of this policy, the impact on the SLA compliance and the resource utilization can be seen in table 322 of FIG. 3F. This way, by adding new structural element the SLA compliances and resource utilization is improved which may help the user for making decisions to govern production support engagement smoothly.

According to embodiments of present disclosure, the system 102 described above may be implemented through the agent-based simulation model in the production support engagement. Further, the knowledge base 222 built on top of the agent-based simulation model may facilitate the user to select correct policies for countering changes in the environment, the pattern of behaviors, and the events. Further, the agent-based simulation model and the knowledge base 222 may also serve as a guide to the users for taking effective policies decisions.

Further, the agent-based simulation model is also capable of simulating in real-time. The initialization of the agent-based simulation model may be considered as a first step towards situation handling (i.e., handling of events). In the case of a real-time simulation, the agent-based simulation model may be initialized using data from the production support engagement. Further, in case of a planning stage simulation, the agent-based simulation model may be initialized to test a policy, test the impact of variation in the production support engagement, formulate policies for a specific set of situations/events or test the robustness of production support engagement model.

According to embodiments of present disclosure, following is a list of databases used by the system 102 for handling the events in the production support engagement. The database is shown in table 2 below.

TABLE 2

Database and its descriptions.

| Database | Description |
|---|---|
| Patterns/Events - - - Policies Database | This database suggests a set of effective/relevant policies for an observed pattern or events. |
| Change in environment - - - Patterns Database | This database store equations that describe relationship between change in environment and parameters affected by the change. If we put the value of contextual parameters the equation computes resulting patterns of behaviour for critical metrics. |
| Pattern - - - Event Database | This database stores events which might be generated as a result of observed patterns. |
| Contextual Parameters - - - Policy Database | This database suggests effective set of policies to counter changes in environment (scenario to policy mapping) |
| Policy - - - Pattern Database | This database stores the metrics that would be impacted as well as the level of impact on choosing a set of policies. |

According to embodiments of present disclosure, the system 102 may also perform root-cause analysis for figuring out changes in the environment or previous policy decisions responsible for the patterns of behaviors. This might help to the users in a case in which the user through dashboard monitoring is aware of an unfavorable pattern but is not able to take effective policy decisions because of unknown root cause.

Figure 4:
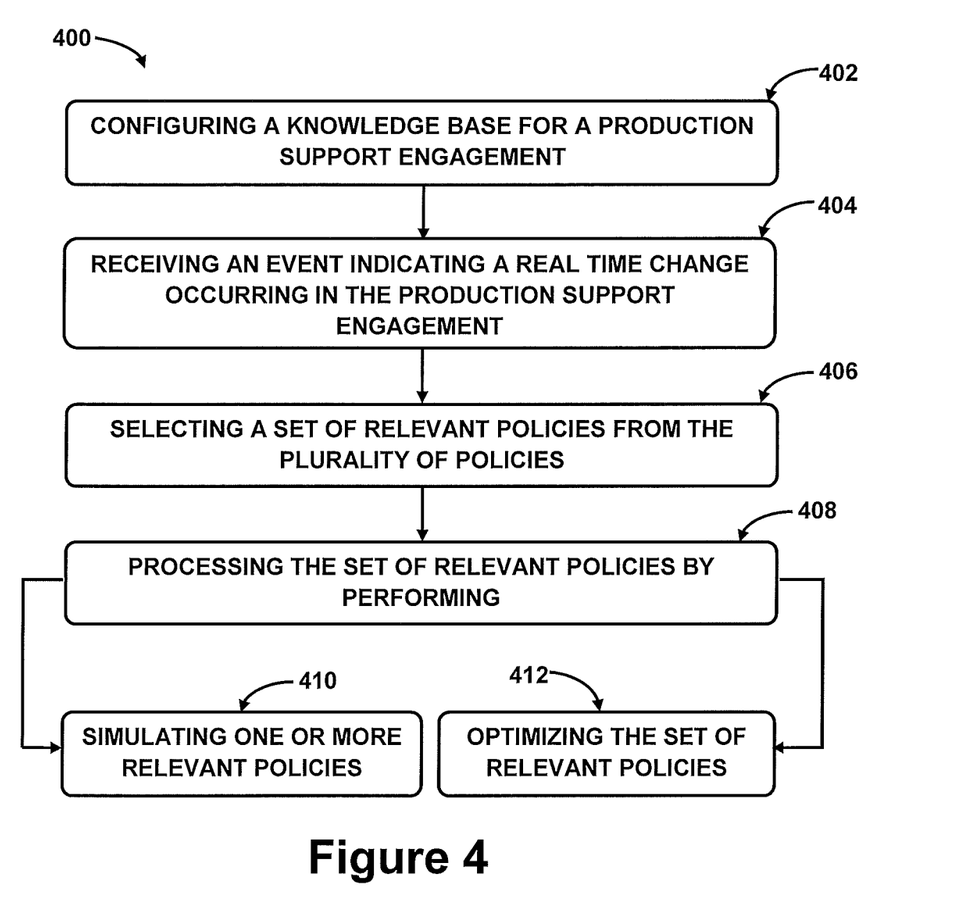
FIG. 4 illustrates a method for selecting an optimal policy to be implemented in a production support engagement, in accordance with an embodiment of the present subject matter.

Referring now to FIG. 4, method for selecting the optimal policy is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, the knowledge base 222 may be configured for the production support engagement. The knowledge base may comprise the plurality of policies, the plurality of reference events, and the plurality of reference scenarios. Further, a policy of the plurality of policies may be associated with a layer of the plurality of layers. Further, the policy may be mapped with a reference scenario, of the plurality of reference scenarios, and a reference event, of the plurality of reference events. According to embodiments, the reference event may indicate a reference change occurring in the production support engagement. Further, the policy may indicate a modification in a structure of the production support engagement corresponding to the reference scenario in order to respond the reference event.

At block 404, the event may be received, wherein the event may indicate a real time change occurring in the production support engagement.

At block 406, the set of relevant policies from the plurality of policies may be selected by matching the event with one of the plurality of reference events.

At block 408, the set of relevant policies may be processed by performing any one of the steps shown in blocks 410 and 412.

At block 410, the simulation may be performed on one or more relevant policies of the set of relevant policies based upon a plurality of scenarios in order to identify a first candidate policy of the set of relevant policies meeting a service level agreement (SLA). The first candidate policy indicates the optimal policy to be implemented in the production support engagement.

At block 412, the optimization may be performed on the set of relevant policies based upon plurality of constraints and objectives to identify a second candidate policy of the set of relevant policies meeting the SLA. Further, the second candidate policy indicates the optimal policy to be implemented in the production support engagement.

Although implementations for methods and systems for selecting the optimal policy have been described in language specific to structural features and/or methods, it is to be understood that the appended claims are not necessarily limited to the specific features or methods described. Rather, the specific features and methods are disclosed as examples of implementations for selecting the optimal policy to be implemented in the production support engagement.

The invention claimed is:

1. A method for selecting an optimal policy to be implemented in a production support engagement to counter one or more changes arising in an enterprise environment, the method comprising:

configuring, by a processor, a knowledge base for a production support engagement, wherein the knowledge base comprises a plurality of policies, a plurality of reference events, and a plurality of reference scenarios, wherein a set of policies of the plurality of policies are associated with a layer of a plurality of layers, and wherein each layer of the plurality of layers is linked with a policy intervention required for implementing the set of policies associated with each layer, wherein the plurality of layers comprises layer 1, layer 2, and layer 3, wherein each policy of the set of policies comprises a set of structural elements and a set of contextual parameters, and wherein the layer 1 has the policy intervention for changing levels in the set of structural elements, the layer 2 has the policy intervention for changing rules governing the set of structural elements, and the layer 3 has the policy intervention for adding one or more new structural elements in the set of structural elements, and wherein a policy of the set of policies is mapped with a reference scenario of the plurality of reference scenarios, and a reference event of the plurality of reference events, and wherein the set of policies so linked are effective for mitigating one or more undesirable patterns of behavior, and one or more changes in the enterprise environment or one or more events caused by the undesirable patterns of behavior, wherein the structural elements are one or more resources or software agents, wherein the reference event is indicative of a reference change occurring in the production support engagement, and wherein the policy indicates a modification in a structure of the production support engagement corresponding to the reference scenario in order to respond to the reference event;

receiving, by the processor, an event triggered due to an undesirable pattern of behavior from the one or more undesirable patterns of behavior indicating a real time change occurring in the production support engagement, wherein the event or the undesirable pattern of behavior arise due to one or more changes occurring in the Enterprise environment or due to an existing policy decision in the production support engagement;

selecting, by the processor, a set of relevant policies from the plurality of policies by matching the event or the undesirable pattern of behavior with one of the plurality of reference events, wherein the set of relevant policies are identified by computing one or more pre-stored equations describing relationship between the change in the enterprise environment and one or more contextual parameters from the set of contextual parameters affected by the change, and the equations compute resulting pattern of behavior or the event based on values provided for the one or more contextual parameters; and processing, by the processor, the set of relevant policies by performing one of simulating one or more relevant policies in order to identify a first candidate policy of the one or more relevant policies, wherein the one or more relevant policies are simulated based upon a plurality of scenarios using an agent-based simulation model, and wherein the first candidate policy meets the service level agreement (SLA), OR optimizing the set of relevant policies by simulating the set of relevant policies based upon the plurality of scenarios using the agent-based simulation model, and applying plurality of constraints and objectives on the set of relevant policies simulated using an optimization model in order to identify a second candidate policy of the set of relevant policies meeting the SLA, wherein the first candidate policy or the second candidate policy indicates an optimal policy to be implemented in the production support engagement by applying the policy intervention of at least one of changing levels in the set of structural elements, changing relationships between structural elements or by changing rules that govern the structural elements or by adding one or more new structural elements in the set of structural elements in order to respond to the event or the undesirable pattern of behavior to counter the real time change occurring in the production support engagement.

2. The method of claim 1, wherein the constraints and objectives for identifying the second candidate policy is received from a user.

3. The method of claim 1, wherein the agent-based simulation model is capable of simulating in a real-time.

4. The method of claim 1, wherein the set of relevant policies comprises process automation, resource management, competency management and knowledge management.

5. The method of claim 1, wherein the rules governing the set of structural elements comprises ticket assignment rules, escalation rules and preemption rules.

6. The method of claim 1, wherein undesirable patterns of behavior comprise an increase in number of situations or incidents per month, a change in a pattern of distribution of incidents, change in percentage of unresolved incidents using Known Error Database (KEDB), change in percentage of high priority situations or incidents, and oscillation in a service level agreement (SLA) compliance.

7. A system for selecting an optimal policy to be implemented in a production support engagement to counter one or more changes arising in an enterprise environment, wherein the system comprises:
a processor;
a memory coupled to the processor, wherein the processor executes a plurality of modules stored in the memory, and wherein the plurality of modules comprises:
a configuring module to configure a knowledge base for a production support engagement, wherein the knowledge base comprises a plurality of policies, a plurality of reference events, and a plurality of reference scenarios, wherein a set of policies of the plurality of policies are associated with a layer of a plurality of layers, and wherein each layer of the plurality of layers is linked with a policy intervention required for implementing the set of policies associated with each layer, wherein the plurality of layers comprises layer 1, layer 2, and layer 3, and wherein each policy of the set of policies comprises a set of structural elements and a set of contextual parameters, and wherein the layer 1 has the policy intervention for changing levels in the set of structural elements, the layer 2 has the policy intervention for changing rules governing the set of structural elements, and the layer 3 has the policy intervention for adding one or more new structural elements in the set of structural elements, and wherein a policy of the set of policies is mapped with a reference scenario of the plurality of reference scenarios, and a reference event of the plurality of reference events, wherein the set of policies so linked are effective for mitigating one or more undesirable patterns of behaviors, and one or more changes in the enterprise environment or one or more events caused by the undesirable patterns of behavior, and wherein the reference event is indicative of a reference change occurring in the production support engagement, and wherein the policy indicates a modification in a structure of the production support engagement corresponding to the reference scenario in order to respond to the reference event;
wherein the structural elements are one or more resources or software agents,
a receiving module to receive the event or an undesirable pattern of behavior indicating a real time change occurring in the production support engagement, wherein the event or the undesirable pattern of behavior arise due to one or more changes occurring in the Enterprise environment or due to an existing policy decision in the production support engagement;
a selecting module to select a set of relevant policies from the plurality of policies by matching the event or the undesirable pattern of behavior with one of the plurality of reference events, wherein the policy is identified by computing one or more pre-stored equations describing relationship between the change in the enterprise environment and one or more contextual parameters from the set of contextual parameters affected by the change, and the one or more equations compute resulting pattern of behavior or the event based on values provided for the one or more contextual parameters; and
a processing module to process the set of relevant policies by performing one of simulating one or more relevant policies selected by a user in order to identify a first candidate policy of the one or more relevant policies, wherein the one or more relevant policies are simulated using an agent-based simulation model, and wherein the first candidate policy meets a service level agreement (SLA), OR optimize optimizing the set of relevant policies by simulating the set of relevant policies based upon the plurality of scenarios using the agent-based simulation model, and applying plurality of constraints and objectives on the set of relevant policies simulated using an optimization model in order to identify a second candidate policy of the set of relevant policies meeting the SLA, wherein the first candidate policy and the second candidate policy indicates an optimal policy to be implemented in the production support engagement by applying the policy intervention of at least one of changing levels in the set of structural elements, changing relationships between structural elements or by changing rules that govern the structural elements or by adding one or more new structural elements in the set of structural elements in order to respond to the event or the undesirable pattern of behavior to counter the real time change occurring in the production support engagement.

8. The system of claim 7, wherein the constraints and objectives for identifying the second candidate policy is received from a user.

9. The system of claim 7, wherein the agent-based simulation model is capable of simulating in a real-time.

10. The system of claim 7, wherein undesirable patterns of behavior comprise an increase in number of situations or incidents per month, a change in a pattern of distribution of incidents, change in percentage of unresolved incidents using Known Error Database (KEDB), change in percentage of high priority situations or incidents, and oscillation in a service level agreement (SLA) compliance.

11. A non-transitory computer readable medium embodying a program executable in a computing device for selecting an optimal policy to be implemented in a production support engagement to counter one or more changes arising in an enterprise environment, the program comprising:

a program code for configuring a knowledge base for a production support engagement, wherein the knowledge base comprises a plurality of policies, a plurality of reference events, and a plurality of reference scenarios, wherein a set of policies of the plurality of policies are associated with a layer of a plurality of layers, and wherein each layer of the plurality of layers is linked with a policy intervention required for implementing the set of policies associated with each layer, wherein the plurality of layers comprises layer 1, layer 2, and layer 3, wherein each policy of the set of policies comprises a set of structural elements and a set of contextual parameters, and wherein the layer 1 has the policy intervention for changing levels in the set of structural elements, the layer 2 has the policy intervention for changing rules governing the set of structural elements, and the layer 3 has the policy intervention for adding one or more new structural elements in the set of structural elements, and wherein a policy of the set of policies is mapped with a reference scenario, of the plurality of reference scenarios, and a reference event, of the plurality of reference events, wherein the set of policies so linked are effective for mitigating one or more undesirable patterns of behavior, and one or more changes in the enterprise environment or one or more events caused by the undesirable patterns of behavior, and wherein the reference event is indicative of a reference change occurring in the production support engagement, and wherein the policy indicates a modification in a structure of the production support engagement corresponding to the reference scenario in order to respond to the reference event;

wherein the structural elements are one or more resources or software agents, a program code for receiving an event triggered due to an undesirable pattern of behavior from the one or more undesirable patterns of behavior indicating a real time change occurring in the production support engagement, wherein the event or the undesirable pattern of behavior arise due to one or more changes occurring in the Enterprise environment or due to an existing policy decision in the production support engagement;

a program code for selecting a set of relevant policies from the plurality of policies by matching the event or the undesirable pattern of behavior with one of the plurality of reference events, wherein the set of relevant policies are identified by computing one or more pre-stored equations describing relationship between the change in the enterprise environment and one or more contextual parameters from the set of contextual parameters affected by the change, and the equations compute resulting pattern of behavior or the event based on values provided for the one or more contextual parameters; and a program code for processing the set of relevant policies by performing one of simulating one or more relevant policies selected by a user in order to identify a first candidate policy of the one or more relevant policies, wherein the one or more relevant policies are simulated based upon a plurality of scenarios using an agent-based simulation model, and wherein the first candidate policy meets a service level agreement (SLA), OR optimizing the set of relevant policies by simulating the set of relevant policies based upon the plurality of scenarios using the agent-based simulation model, and applying plurality of constraints and objectives on the set of relevant policies simulated using an optimization model in order to identify a second candidate policy of the set of relevant policies meeting the SLA, wherein the first candidate policy and the second candidate policy indicates an optimal policy to be implemented in the production support engagement by applying the policy intervention of at least one of changing levels in the set of structural elements, changing relationships between structural elements or by changing rules that govern the structural elements or by adding one or more new structural elements in the set of structural elements in order to respond to the event or the undesirable pattern of behavior to counter the real time change occurring in the production support engagement.

* * * * *